United States Patent
Rosko et al.

(10) Patent No.: US 7,108,012 B2
(45) Date of Patent: Sep. 19, 2006

(54) FLUID CONTROL VALVE

(75) Inventors: Michael Scot Rosko, Greenwood, IN (US); Patrick Jonte, Zionsville, IN (US)

(73) Assignee: Masco Corporation of Indiana, Indianapolis, ID (US)

( * ) Notice: Subject to any disclaimer, the term of this patent is extended or adjusted under 35 U.S.C. 154(b) by 179 days.

(21) Appl. No.: 10/897,282

(22) Filed: Jul. 22, 2004

(65) Prior Publication Data

US 2006/0016491 A1  Jan. 26, 2006

(51) Int. Cl.
    *E03B 3/26* (2006.01)
(52) U.S. Cl. .................................. 137/625.4; 251/297
(58) Field of Classification Search ............ 137/625.4, 137/625.41, 625.17, 636.2, 636.3; 251/297
    See application file for complete search history.

(56) References Cited

U.S. PATENT DOCUMENTS

| | | | |
|---|---|---|---|
| 2,849,548 A | 8/1958 | Young ........................... 200/6 |
| 3,056,867 A | 10/1962 | Eitel ............................ 200/81 |
| 3,543,799 A * | 12/1970 | Hayman .................... 137/636.2 |
| 3,589,242 A | 6/1971 | Peterson et al. .............. 91/413 |
| 3,667,503 A * | 6/1972 | Farrell et al. ............. 137/625.4 |
| 3,680,592 A | 8/1972 | Hayman .................... 137/625.4 |
| 3,698,415 A | 10/1972 | Forster et al. .............. 137/102 |
| 3,766,944 A | 10/1973 | Distler ..................... 137/625.6 |
| 3,915,195 A | 10/1975 | Manoogian et al. ... 137/625.41 |
| 3,952,764 A | 4/1976 | Keller, III ................... 137/119 |
| 3,958,601 A | 5/1976 | Schmitt .................... 137/626.2 |
| 3,965,935 A | 6/1976 | Morisseau ............... 137/625.4 |
| 4,043,359 A | 8/1977 | Christo ................... 137/625.41 |
| 4,084,611 A | 4/1978 | Mahrer .................... 137/454.2 |
| 4,183,377 A | 1/1980 | Bernat ................... 137/625.17 |
| 4,200,123 A | 4/1980 | Brandelli .................. 137/625.4 |
| 4,301,830 A | 11/1981 | Keller, III ................ 137/454.6 |
| 4,337,795 A | 7/1982 | Argyris et al. ......... 137/625.17 |
| 4,349,177 A | 9/1982 | Shimada et al. ............ 251/230 |
| 4,357,957 A | 11/1982 | Bisonaya et al. ........ 137/636.1 |
| 4,554,943 A * | 11/1985 | Claney et al. .............. 137/242 |
| 4,586,534 A | 5/1986 | McNeely .................... 137/515.7 |
| 4,604,502 A | 8/1986 | Thomas ....................... 200/6 A |
| 4,605,200 A | 8/1986 | Huppee ...................... 251/258 |
| 4,610,268 A | 9/1986 | Knapp ...................... 137/454.6 |
| 4,633,906 A | 1/1987 | Tuchman ............... 137/625.17 |
| 4,708,172 A | 11/1987 | Riis ....................... 137/625.17 |
| 4,733,694 A | 3/1988 | Knapp .................... 137/625.17 |
| 4,739,523 A | 4/1988 | Bondar ......................... 4/191 |
| 4,754,783 A | 7/1988 | Knapp ..................... 137/625.4 |
| 4,768,552 A | 9/1988 | Stella ...................... 137/625.4 |

(Continued)

FOREIGN PATENT DOCUMENTS

EP    0 311 546 A2    4/1989

(Continued)

*Primary Examiner*—John Fox
(74) *Attorney, Agent, or Firm*—Woodard, Emhardt, Moriarty, McNett & Henry LLP

(57) ABSTRACT

A fluid control valve for the mixing of hot and cold water and delivery at a selected flow rate is described wherein an upper housing and lower housing are clamped together by a snap-fit connection thereby enclosing other fluid control valve component parts. A ball stem is manually movable in two separate and independent directions of motion. There is frictional loading on the ball stem such that movement in one direction to control the water temperature has a frictional loading that is higher than the frictional loading in the other direction to control the flow rate. A spring-biased guide pin is used to increase the frictional loading in the one direction.

16 Claims, 16 Drawing Sheets

U.S. PATENT DOCUMENTS

| | | | | |
|---|---|---|---|---|
| 4,768,557 A | 9/1988 | Holzer | ............... | 137/636.2 |
| 4,782,853 A | 11/1988 | Moen | ............... | 137/454.6 |
| 4,854,347 A | 8/1989 | Knapp | ............... | 137/625.4 |
| 4,854,498 A | 8/1989 | Stayton | ............... | 236/12.12 |
| 4,932,433 A | 6/1990 | Knapp | ............... | 137/381 |
| 4,942,902 A | 7/1990 | Knapp | ............... | 137/625.17 |
| 4,957,135 A | 9/1990 | Knapp | ............... | 137/454.6 |
| 5,100,565 A * | 3/1992 | Fujiwara et al. | ............... | 251/368 |
| 5,170,816 A | 12/1992 | Schnieders | ............... | 137/556.6 |
| 5,204,507 A | 4/1993 | Saeda et al. | ............... | 219/121.82 |
| 5,293,900 A | 3/1994 | Karbassi et al. | ............... | 137/554 |
| 5,295,513 A | 3/1994 | Hori | ............... | 137/636.2 |
| 5,342,018 A | 8/1994 | Wu | ............... | 251/250 |
| 5,542,449 A | 8/1996 | Huang | ............... | 137/551 |
| 5,559,432 A | 9/1996 | Logue | ............... | 324/207.17 |
| 5,570,720 A | 11/1996 | Riis | ............... | 137/625.17 |
| 5,592,971 A | 1/1997 | Knapp | ............... | 137/625.41 |
| 5,613,521 A | 3/1997 | Knapp | ............... | 137/625.41 |
| 5,647,530 A | 7/1997 | Lorch | ............... | 236/12.14 |
| 5,692,541 A | 12/1997 | Brown | ............... | 137/636.2 |
| 5,743,297 A | 4/1998 | Mueller | ............... | 137/636.2 |
| 5,810,050 A | 9/1998 | Pickerrell et al. | ............... | 137/625.41 |
| 5,896,601 A | 4/1999 | Humpert et al. | ............... | 4/677 |
| 5,937,897 A | 8/1999 | Chatterjea et al. | ............... | 137/554 |
| 5,967,184 A | 10/1999 | Chang | ............... | 137/625.17 |
| 5,967,409 A | 10/1999 | Benedict | ............... | 236/92 R |
| 5,971,285 A | 10/1999 | Knapp | ............... | 236/12.2 |
| 6,045,118 A | 4/2000 | Knapp | ............... | 251/231 |
| 6,050,285 A | 4/2000 | Goncze et al. | ............... | 137/98 |
| 6,131,600 A | 10/2000 | Chang | ............... | 137/100 |
| 6,179,130 B1 | 1/2001 | Nguyen et al. | ............... | 210/424 |
| 6,183,636 B1 | 2/2001 | Bowers et al. | ............... | 210/232 |
| 6,271,828 B1 | 8/2001 | Rosenberg et al. | ............... | 345/156 |
| 6,298,875 B1 | 10/2001 | Warshawsky et al. | ............... | 137/606 |
| 6,300,937 B1 | 10/2001 | Rosenberg | ............... | 345/156 |
| 6,325,089 B1 | 12/2001 | Breda | ............... | 137/98 |
| 6,394,133 B1 | 5/2002 | Knapp | ............... | 137/615 |
| 6,429,849 B1 | 8/2002 | An et al. | ............... | 345/161 |
| 6,517,006 B1 * | 2/2003 | Knapp | ............... | 236/12.2 |
| 6,920,899 B1 * | 7/2005 | Haenlein et al. | ............... | 137/636.3 |
| 2002/0062867 A1 | 5/2002 | Kempf et al. | ............... | 137/334 |
| 2004/0118455 A1 | 6/2004 | Welty et al. | ............... | 137/375 |

FOREIGN PATENT DOCUMENTS

| | | |
|---|---|---|
| EP | 0 855 544 A2 | 7/1998 |
| JP | 6-331058 | 11/1994 |
| JP | 8-35568 | 2/1996 |
| WO | WO 96/24793 | 8/1996 |

* cited by examiner

FLUID CONTROL VALVE

BACKGROUND OF THE INVENTION

The present invention relates in general to a fluid control valve for the control of fluid delivery parameters such as flow rate and temperature. More specifically, the present invention relates to a fluid control valve that is preferably part of a residential faucet for control of the water flow rate and temperature.

Whenever a fluid control valve of the type described herein is designed, it is important to consider the ergonomics of daily use as well as the durability and reliability. Ease of use, including safety, is important. It is also important to control the cost of manufacturing the fluid control valve components and the cost to assemble those components into a functioning valve. The present invention addresses these design items with a number of innovative, structural features as will be described. One of the important structural features of the present invention is briefly described below, as an example of how innovative structural features can improve the ergonomics of daily use.

The fluid control valve according to the present invention includes a control lever that is constructed and arranged for movement about a first axis to adjust the water flow rate as it exits from the nozzle. The control lever is also movable about a second axis, independently of movement about the first axis, to adjust the water temperature.

This construction for the fluid control valve of the present invention results in the control lever having a rectangular motion pattern that is preferably a "square" motion pattern. While other fluid control valves are constructed and arranged to enable the control of the water flow rate and the water temperature, often these other designs do not have two degrees of freedom that are independent of each other. Designs where the control lever returns to a neutral temperature position at the flow shut off position do not permit any type of temperature position memory.

The independent, square motion pattern, while beneficial in its own right, enables another feature to be incorporated into the construction of the fluid control valve according to the present invention. This other feature includes creating different frictional forces for influencing the movement of the control lever. A higher frictional force influences the movement of the control arm in a first direction of motion. A lower or lighter frictional force influences the movement of the control arm in a second direction of motion. In the context of the present invention, the first direction of motion adjusts the water temperature and the second direction of motion adjusts the fluid flow rate. In this way, the "tendency" of the control arm, as it is manipulated by the user, is to more easily be moved to change the flow rate as contrasted to changing the temperature of the water. By creating a differential frictional force between the ON-OFF direction (i.e., flow rate) and the HOT-COLD direction (i.e., water temperature), a "memory" for the temperature position that was used last or a memory for a pre-selected temperature can be created.

Other innovative structural features according to the present invention are described herein. While each one is believed to be novel and unobvious, it is clear that their combination into a fluid control valve creates a unique structure.

SUMMARY OF THE INVENTION

A fluid control valve for the mixing of hot and cold water and delivery at a selected flow rate according to one embodiment of the present invention comprises a lower housing having an open interior and defining a plurality of flow inlets and a flow outlet, a first flow disc positioned within the open interior, a second flow disc positioned on the first flow disc and being movable relative to the first flow disc to control the mixing proportions of hot and cold water and to control the flow rate of water to be delivered via the flow outlet, a carrier constructed and arranged to control the movement of the second flow disc, a ball stem having a ball portion and a control lever, the ball portion being connected to the carrier whereby movement of the control lever rotates the ball portion and rotation of the ball portion translates into lateral movement of the carrier, a guide pin assembled into the ball portion, a clamp plate receiving the ball portion and an upper housing constructed and arranged to enclose the ball portion in cooperation with the clamp plate, wherein the guide pin engages a portion of the upper housing and wherein the ball stem is constructed and arranged for movement in a first direction for controlling the mixing proportions of hot and cold water and in a second direction that is independent of the first direction for controlling the water flow rate.

One object of the present invention is to provide an improved fluid control valve.

Related objects and advantages of the present invention will be apparent from the following description.

DESCRIPTION OF THE PREFERRED EMBODIMENTS

Figure 1:
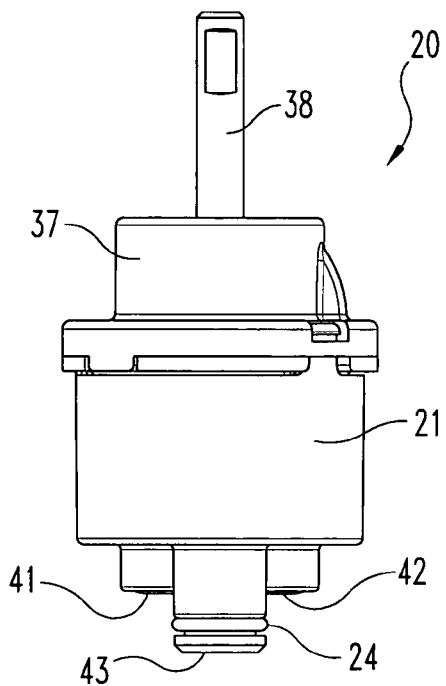
FIG. 1 is a front elevational view of a fluid control valve according to a typical embodiment of the present invention.
Figure 2:
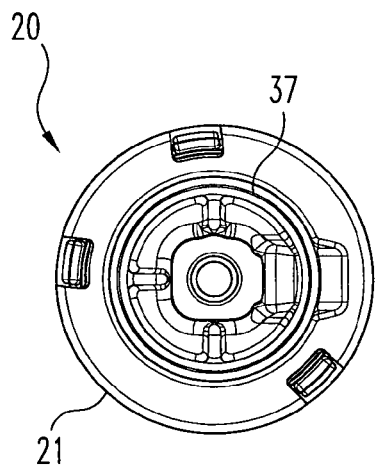
FIG. 2 is a top plan view of the FIG. 1 fluid control valve.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 3:
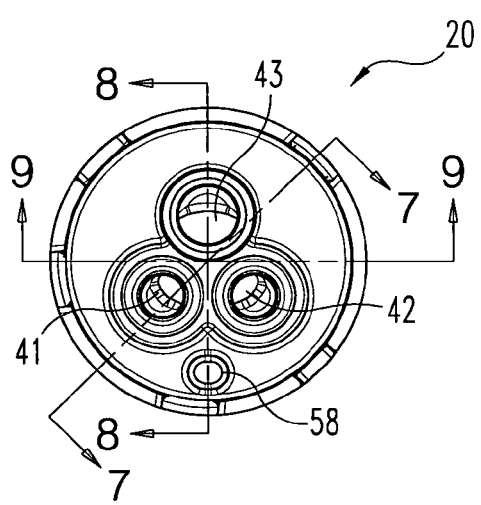
FIG. 3 is a bottom plan view of the FIG. 1 fluid control valve.
Figure 4:
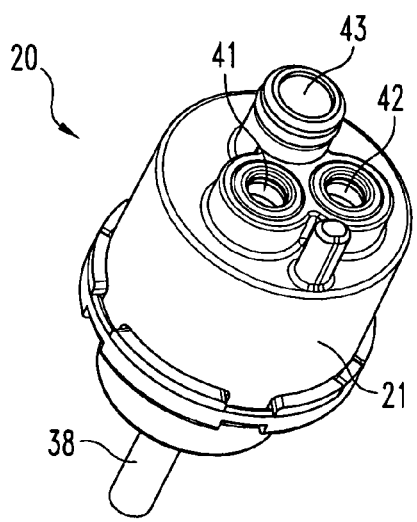
FIG. 4 is a bottom perspective view of the FIG. 1 fluid control valve
Figure 5:
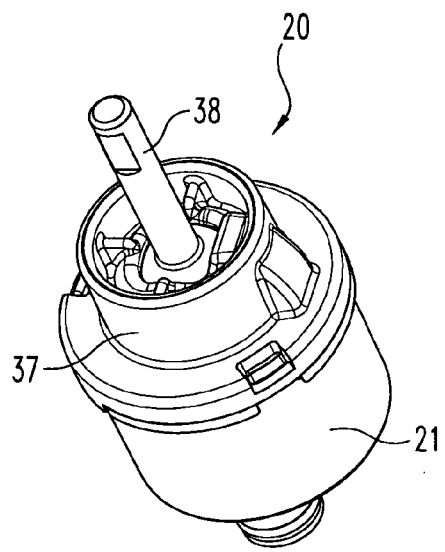
FIG. 5 is a top perspective view of the FIG. 1 fluid control valve
Figure 6:
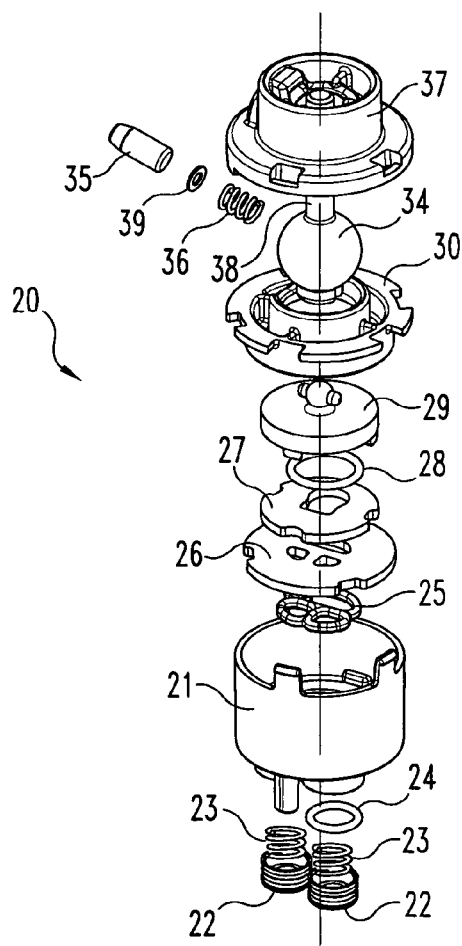
FIG. 6 is an exploded, front perspective view of the FIG. 1 fluid control valve.
Figure 7:
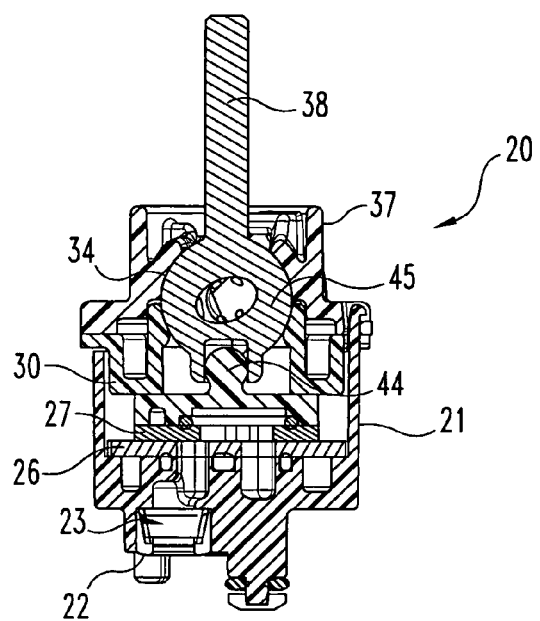
FIG. 7 is an oblique, elevational view, in full section, of the FIG. 1 fluid control valve as viewed along line 7—7 in FIG. 3.
Figure 8:
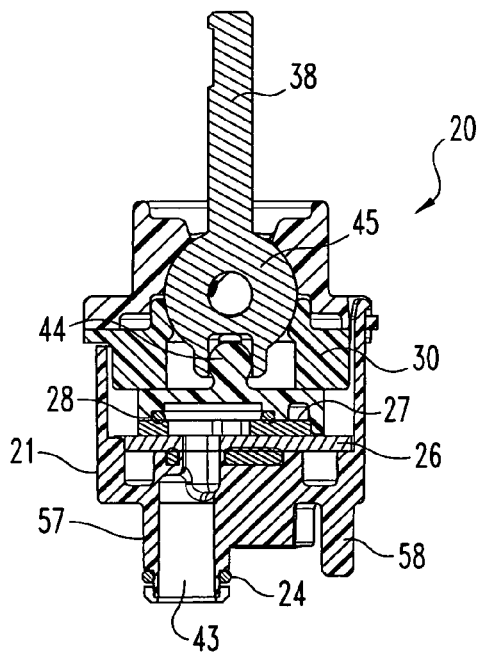
FIG. 8 is a side elevational view, in full section, of the FIG. 1 fluid control valve as viewed along line 8—8 in FIG. 3.
Figure 9:
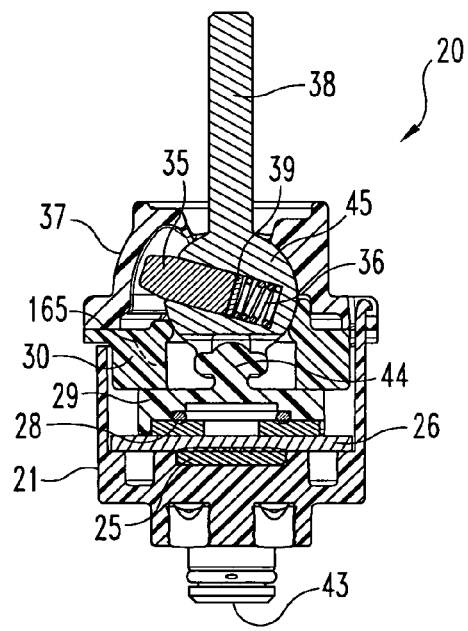
FIG. 9 is a front elevational view, in full section, of the FIG. 1 fluid control valve as viewed along line 9—9 in FIG. 3.
Figure 10:
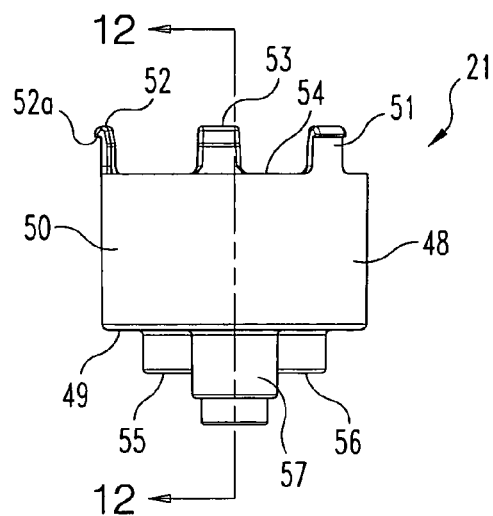
FIG. 10 is a front elevational view of a lower housing that comprises one component part of the FIG. 1 fluid control valve.
Figure 11:
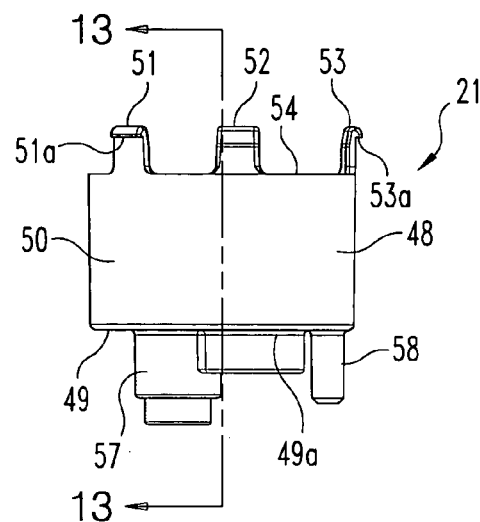
FIG. 11 is a side elevational view of the FIG. 10 lower housing.
Figure 12:
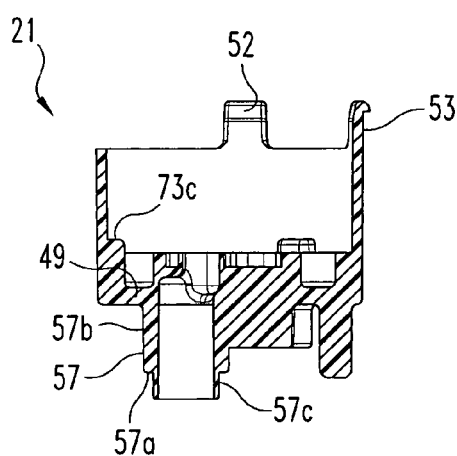
FIG. 12 is a front elevational view, in full section, of the FIG. 10 lower housing as viewed along line 12—12 in FIG. 10.
Figure 13:
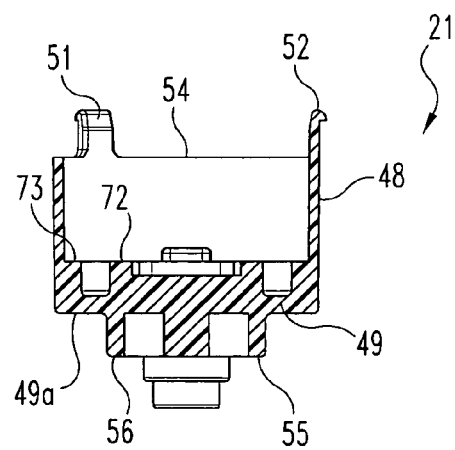
FIG. 13 is a front elevational view, in full section, of the FIG. 10 lower housing as viewed along line 13—13 in FIG. 11.
Figure 14:
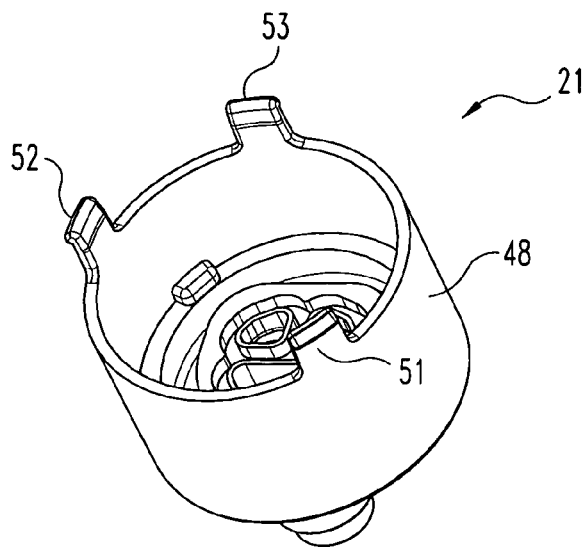
FIG. 14 is a top perspective view of the FIG. 10 lower housing.
Figure 15:
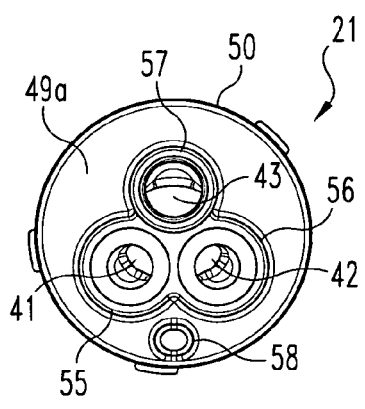
FIG. 15 is a bottom plan view of the FIG. 10 lower housing.

Referring to FIGS. 1–9, there is illustrated a fluid control valve 20 that is constructed and arranged according to the present invention. The overall, exterior appearance of fluid control valve 20 is illustrated in FIGS. 1–5. An exploded view of the fluid control valve 20 is provided in FIG. 6 and full section views are provided by FIGS. 7–9. The section cutting planes for FIGS. 7–9 are illustrated in FIG. 3. Since a number of the component parts that comprise fluid control valve 20 are on the interior, the views of FIGS. 6–9 are helpful for a complete understanding of the configuration and assembly of fluid control valve 20.

Figure 17:
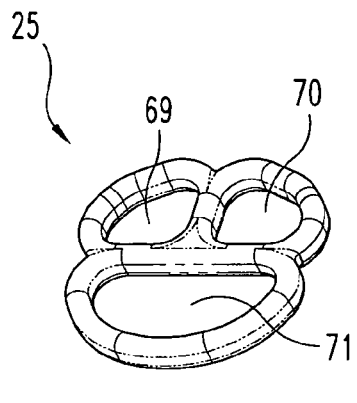
FIG. 17 is a top perspective view of a bottom plate seal that comprises another component part of the FIG. 1 fluid control valve.
Figure 18:
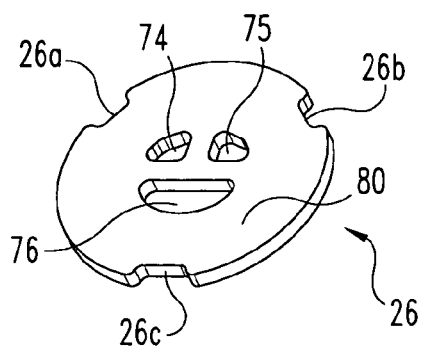
FIG. 18 is a top perspective view of a bottom plate that comprises another component part of the FIG. 1 fluid control valve.
Figure 19:
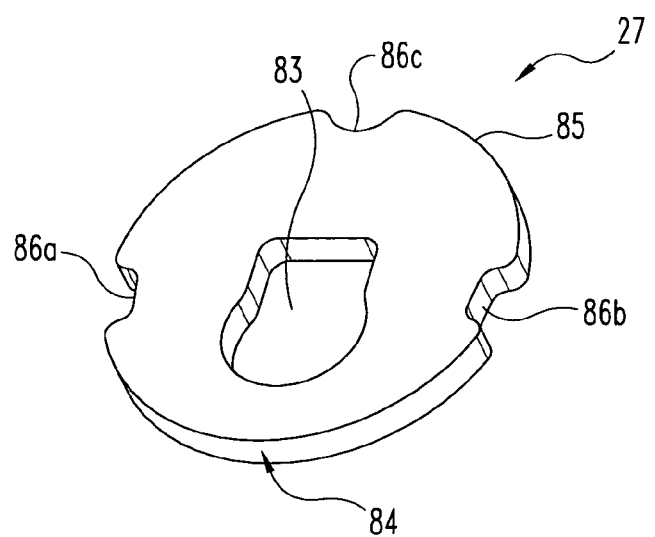
FIG. 19 is a top perspective view of an upper plate that comprises another component part of the FIG. 1 fluid control valve.
Figure 20:
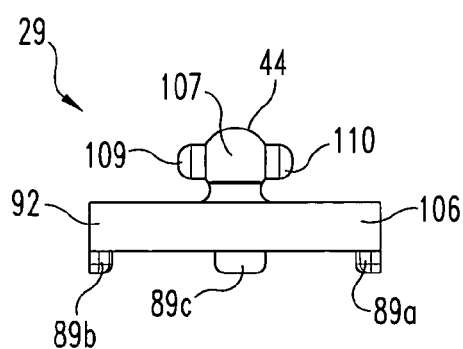
FIG. 20 is a front elevational view of an upper carrier that comprises another component part of the FIG. 1 fluid control valve.
Figure 21:
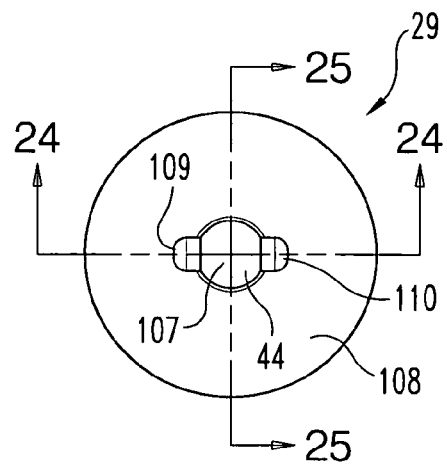
FIG. 21 is a top plan view of the FIG. 20 upper carrier.
Figure 22:
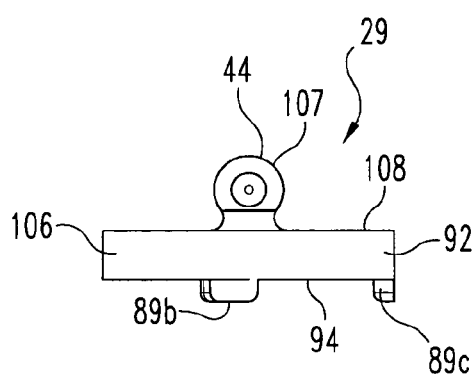
FIG. 22 is a side elevational view of the FIG. 20 upper carrier.
Figure 23:
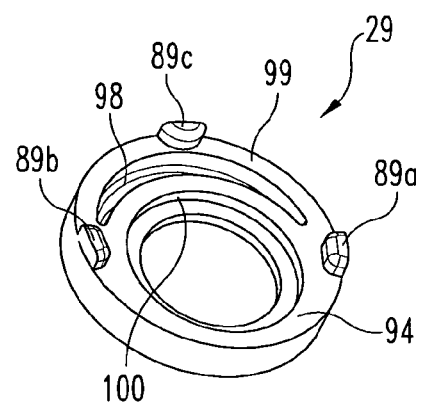
FIG. 23 is a bottom perspective view of the FIG. 20 upper carrier.
Figure 24:
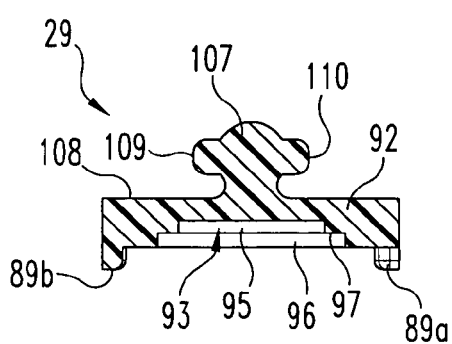
FIG. 24 is a front elevational view, in full section, of the FIG. 20 upper carrier as viewed along line 24—24 in FIG. 1.
Figure 25:
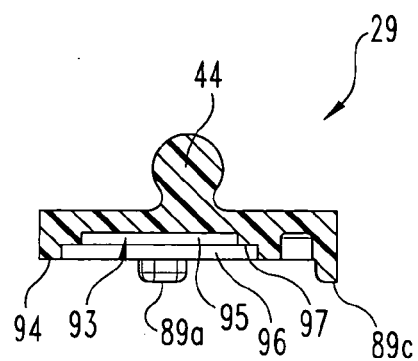
FIG. 25 is a side elevational view, in full section, of the FIG. 20 upper carrier as viewed along line 25—25 in FIG. 21.
Figure 26:
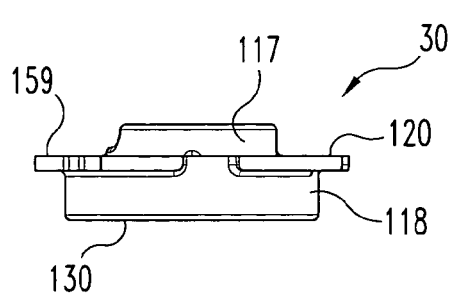
FIG. 26 is a front elevational view of a clamp plate that comprises another component part of the FIG. 1 fluid control valve.
Figure 27:
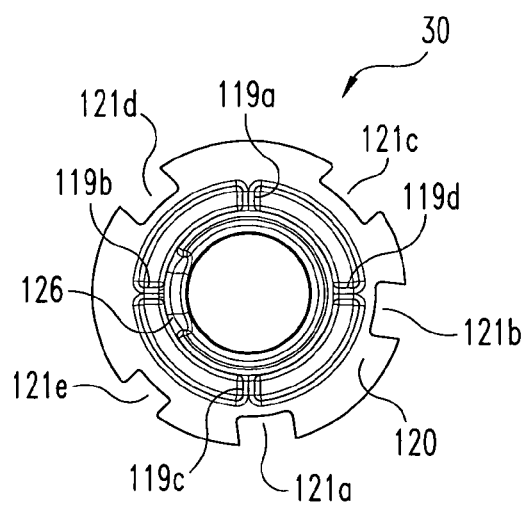
FIG. 27 is a top plan view of the FIG. 26 clamp plate.
Figure 28:
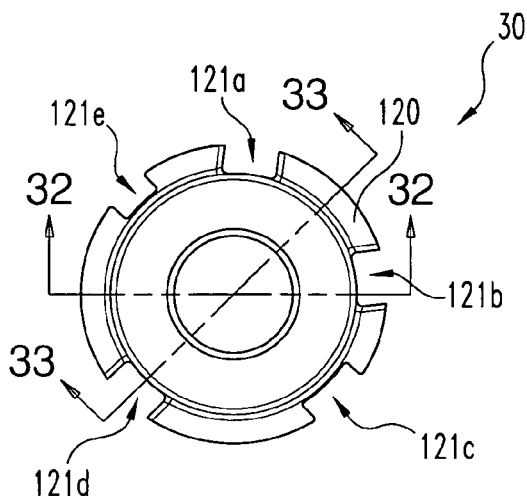
FIG. 28 is a bottom plan view of the FIG. 26 clamp plate.
Figure 29:
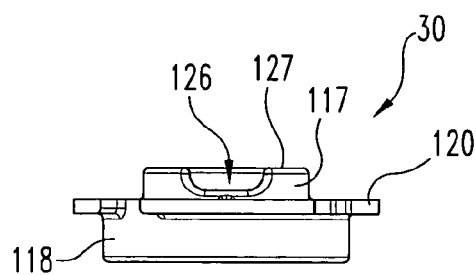
FIG. 29 is a side elevational view of the FIG. 26 clamp plate.
Figure 30:
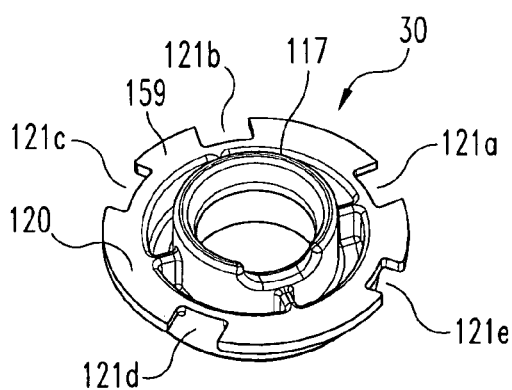
FIG. 30 is a top perspective view of the FIG. 26 clamp plate.
Figure 31:
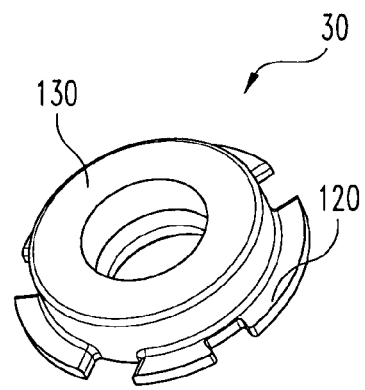
FIG. 31 is a bottom perspective view of the FIG. 26 clamp plate.
Figure 32:
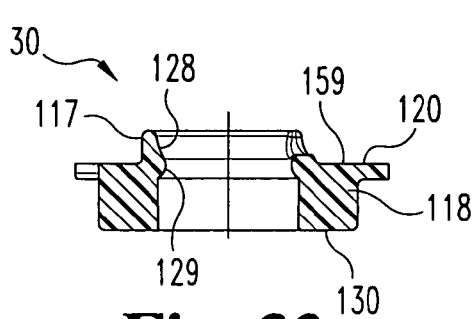
FIG. 32 is a front elevational view, in full section, of the FIG. 26 clamp plate as viewed along line 32—32 in FIG. 28.
Figure 33:
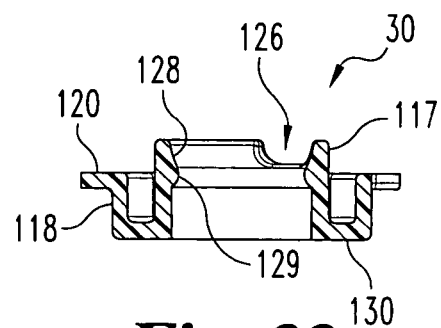
FIG. 33 is an oblique elevational view, in full section, of the FIG. 26 clamp plate as viewed along line 33—33 in FIG. 28.
Figure 34:
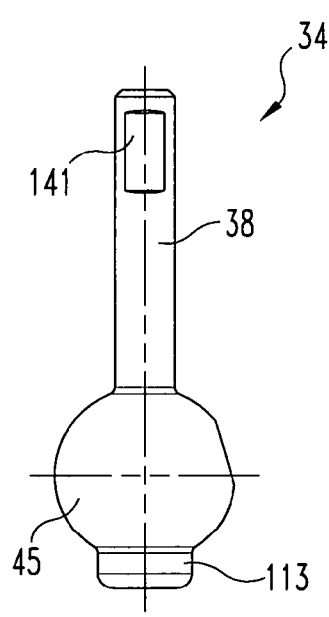
FIG. 34 is a front elevational view of a ball stem that comprises another component part of the FIG. 1 fluid control valve.
Figure 35:
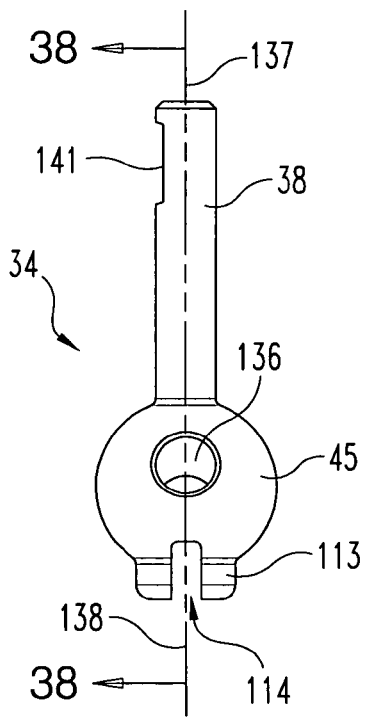
FIG. 35 is a side elevational view of the FIG. 34 ball stem.
Figure 36:
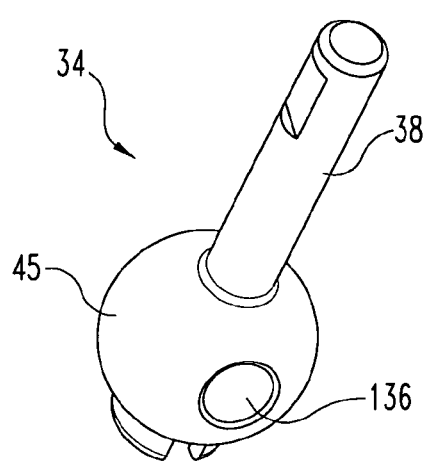
FIG. 36 is a top perspective view of the FIG. 34 ball stem.
Figure 37:
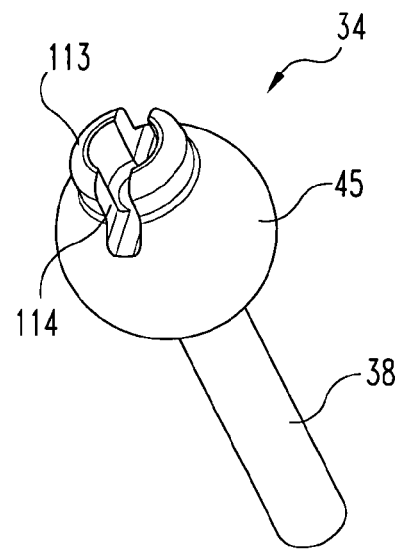
FIG. 37 is a bottom perspective view of the FIG. 34 ball stem.
Figure 38:
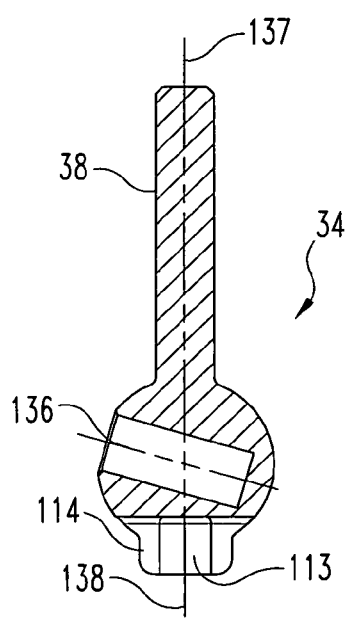
FIG. 38 is a front elevational view, in full section, of the FIG. 34 ball stem as viewed along line 38—38 in FIG. 35.

Referring first to FIG. 6, the sequential stack of the component parts comprising fluid control valve 20 is illustrated. Fluid control valve 20 includes a bottom or lower housing 21 that receives seats 22, seat springs 23, and snout seal 24. The details of the bottom housing 21 are illustrated in FIGS. 10–16. Continuing with FIG. 6, bottom housing 21 receives bottom plate seal 25, bottom plate or disc 26, top plate or disc 27, top plate seal 28, carrier 29, and clamp plate 30. The details of bottom plate seal 25 are illustrated in FIG. 17. The details of bottom plate 26 are illustrated in FIG. 18. The details of top plate 27 are illustrated in FIG. 19. The details of carrier 29 are illustrated in FIGS. 20–25. The details of clamp plate 30 are illustrated in FIGS. 26–33.

Figure 39:
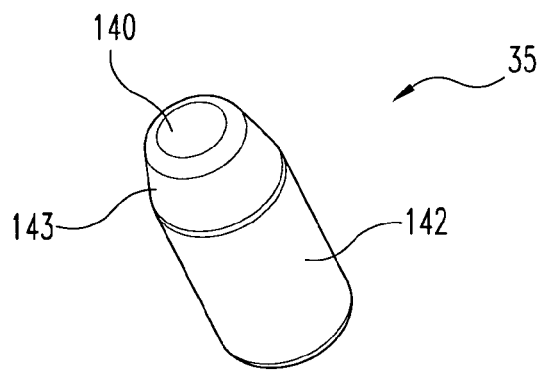
FIG. 39 is a perspective view of a spring pin that comprises another component part of the FIG. 1 fluid control valve.
Figure 40:
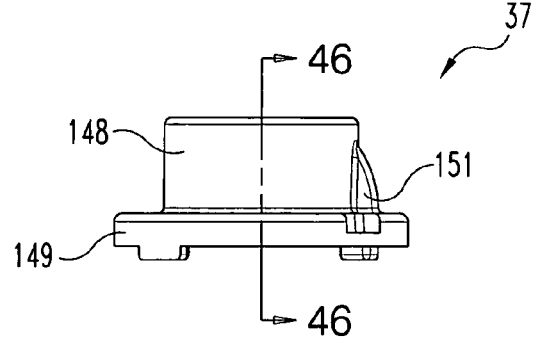
FIG. 40 is a front elevational view of a top housing that comprises another component part of the FIG. 1 fluid control valve.
Figure 41:
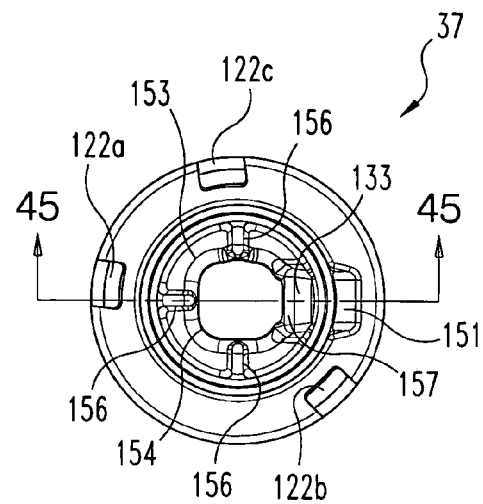
FIG. 41 is a top plan view of the FIG. 40 top housing.
Figure 42:
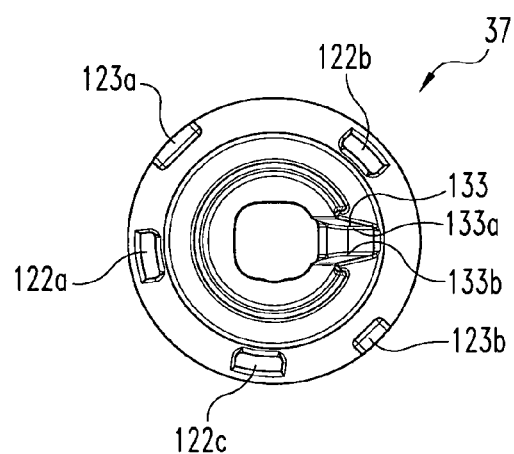
FIG. 42 is a bottom plan view of the FIG. 40 top housing.
Figure 43:
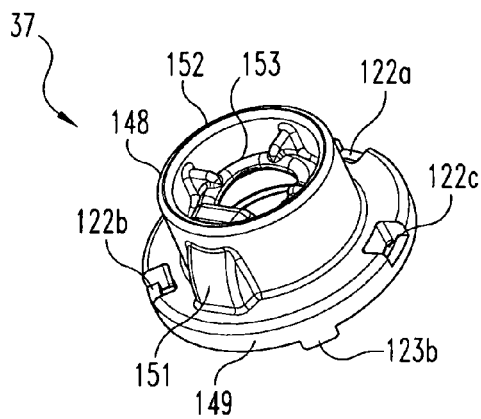
FIG. 43 is a top perspective view of the FIG. 40 top housing.
Figure 44:
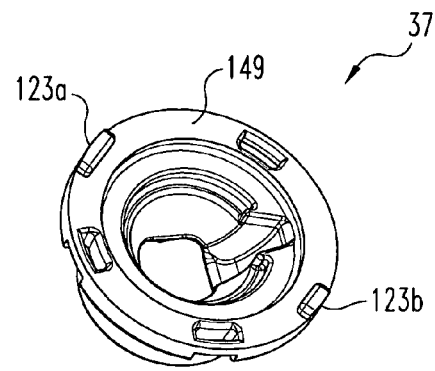
FIG. 44 is a bottom perspective view of the FIG. 40 top housing.
Figure 45:
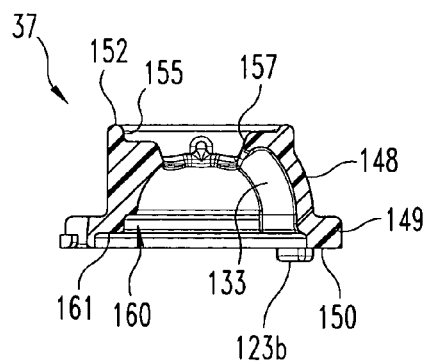
FIG. 45 is front elevational view, in full section, of the FIG. 40 top housing as viewed along line 45—45 in FIG. 41.
Figure 46:
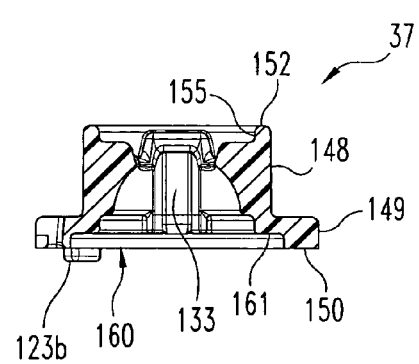
FIG. 46 is a side elevational view, in full section, of the FIG. 40 top housing as viewed along line 46—46 in FIG. 40.
Figure 48:
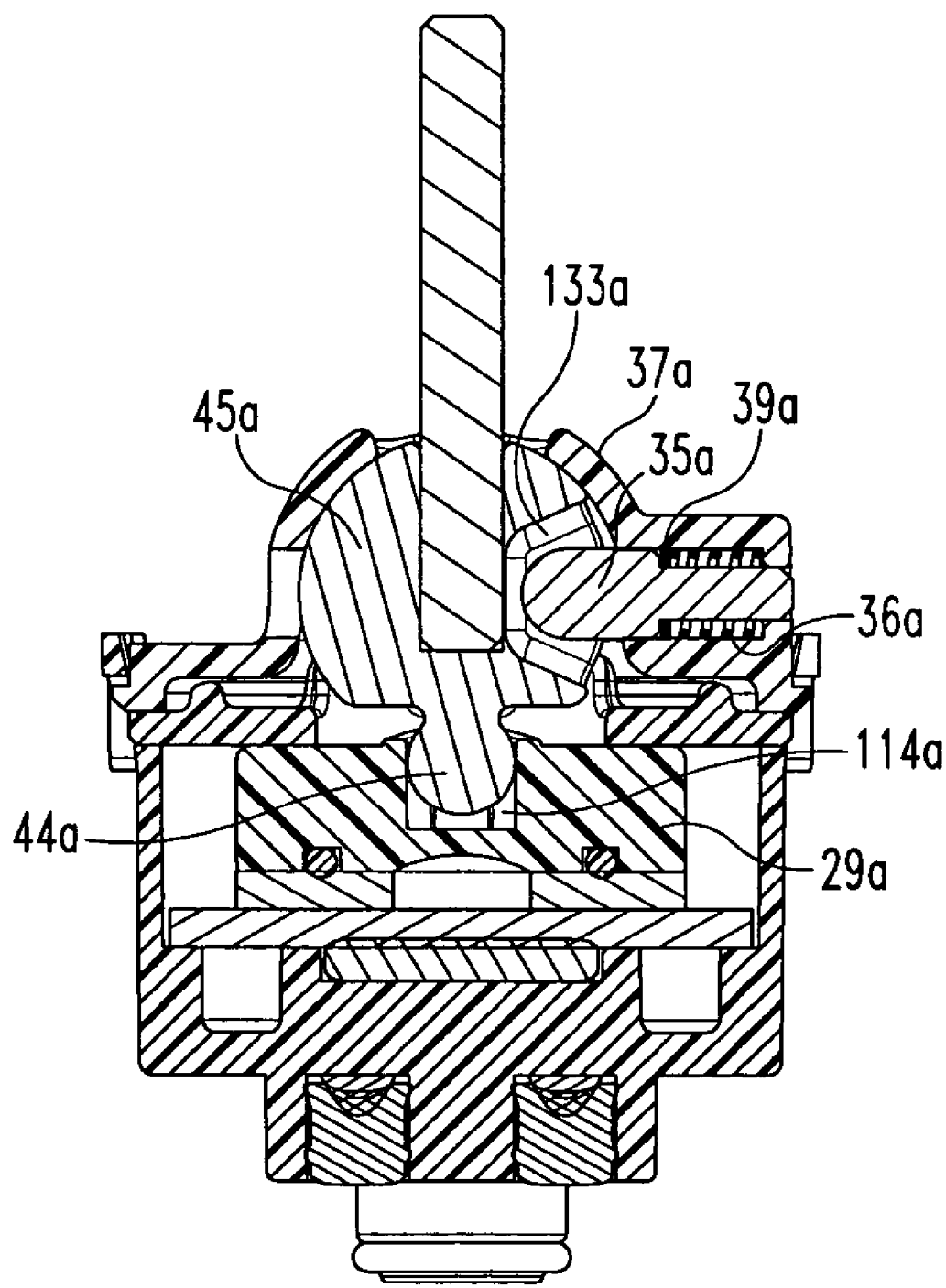
FIG. 48 is a front elevational view, in full section, of an alternative construction for the FIG. 1 fluid control valve.
Figure 49:
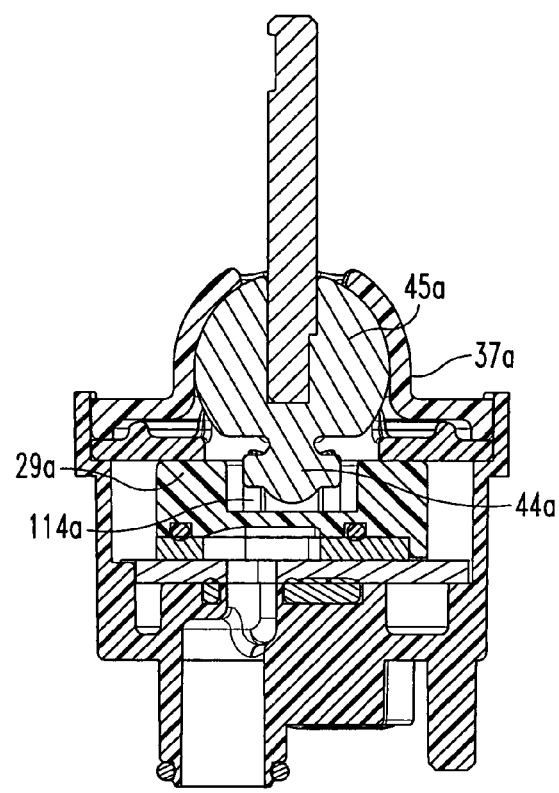
FIG. 49 is a side elevational view, in full section, of an alternative construction for the FIG. 1 fluid control valve.
Figure 50:
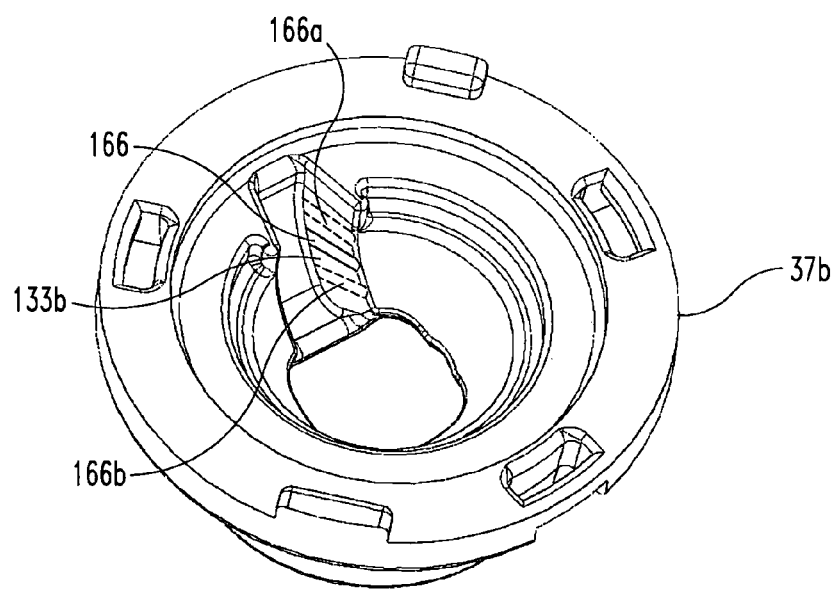
FIG. 50 is a bottom perspective view of an alternative construction for the FIG. 1 fluid control valve.

With continued reference to FIG. 6, ball stem 34 seats into clamp plate 30 and connects to a portion of carrier 29. An alternative constructions is illustrated in FIGS. 49 and 50. Spring (guide) pin 35 and spring 36 are received by ball stem 34. An alternative construction is illustrated in FIG. 48. Both constructions (FIG. 6 and FIG. 48) include a TEFLON washer 39 that is positioned between pin 35 and spring 36. In FIG. 48 these parts are identified as pin 35a, spring 36a, and TEFLON washer 39a. The use of a TEFLON washer reduces the friction at the pin-spring interface. Top housing 37 completes the assembly of fluid control valve 20. The control lever 38 of the ball stem 34 extends upwardly through top housing 37. The details of ball stem 34 are illustrated in FIGS. 34–38. The details of spring pin 35 are illustrated in FIG. 39. The details of the top housing are illustrated in FIGS. 40–46.

As will be described in greater detail, bottom housing 21 defines two inlet openings 41 and 42 and one outlet opening 43. When fluid control valve 20 is used for water, the two inlet openings 41 and 42 are used for the receipt of hot water and cold water in a selected mix ratio, depending on the position of the movable top plate 27 relative to the stationary bottom plate 26. While these two components are referenced herein as "plates", their relatively thin, flat and part-circular shape allows the alternative reference of "disc". The one outlet opening 43 is used for the delivery of water at the selected temperature to a remote location and at a flow rate that is controlled by the position of the movable top plate 27 relative to the stationary bottom plate 26. The ball stem 34 is connected to the raised post 44 of carrier 29 and carrier 29 interfits with top plate 27. Control lever 38 is used to manipulate the orientation of the ball portion 45 of ball stem 34 and this in turn translates from pivotal motion into lateral sliding movement of top plate 27 across the upper surface of bottom plate 26.

Referring now to FIGS. 10–16, the bottom housing 21 is illustrated in greater detail. Bottom housing 21 is a unitary, molded plastic structure that is preferably fabricated from acetel. Alternatively this component can be fabricated out of stainless steel or other metals. Bottom housing 21 includes a hollow, annular body 48 with a base 49, sidewall 50, and three snap-fit prongs 51–53 axially extending upwardly away from and beyond sidewall free edge 54. While three prongs 51–53 are disclosed, it should be understood that in this case, the actual number can vary. In the description that follows, there are various tabs and projections disclosed and while the number of each that are disclosed represents the preferred design, alternative numbers of tabs and projections can be used. Sidewall 50 in cooperation with base 49 define an open interior. Each prong 51–53 includes a ratchet-like tip 51a–53a, respectively, for snapping into cooperating openings (notches) in top housing 37 as will be described. Base 49 defines inlet openings 41 and 42 and outlet opening 43. The outer surface 49a of base 49 is integrally formed with inlet opening sleeves 55 and 56 and with outlet opening sleeve 57. Sleeves 55–57 extend away from outer surface 49a. Sleeve 55 surrounds and is concentric with inlet opening 41. Sleeve 56 surrounds and is concentric with inlet opening 42. Sleeve 57 surrounds and is concentric with outlet opening 43. Also integrally molded as part of base 49 and extending away from the outer surface 49a is a combination anti-rotation key and alignment post 58 for helping to position fluid control valve 20 into the faucet housing or receiving base (not illustrated) for maintaining that installed position. A typical receiving base connects to the incoming water lines and the flow outlet line and defines flow openings to communicate with openings 41–43 in a leak-free manner. A small blind hole in the receiving base receives the alignment post 58.

Each sleeve 55 and 56 receives an assembled combination of a seat 22 and seat spring 23 (see FIG. 7). The seat 22 captures one end of its corresponding spring 23 with the opposite end of the spring 23 contacting base 49. Each sleeve 55 and 56 is sized with an inside diameter that is larger than the outside diameter of the corresponding inlet opening so that there is an annular ring-shaped land area for the opposite end of spring 23 to seat against. The seat and spring combination is concentric to its corresponding inlet opening (41 or 42). Compression of spring 23 allows seat 22 to become flush with the free end of its corresponding sleeve (55 or 56). Sleeve 57 is shouldered so as to create an O-ring shelf 57a between a larger outside diameter portion 57b and a smaller outside diameter portion 57c. Snout seal 24 is received by portion 57c and seats against shelf 57a.

Integrally molded as part of the inner surface 49b of base 49 is a raised protrusion 62. Protrusion 62 defines three openings 63, 64, and 65 that are in flow communication with openings 41, 42, and 43, respectively. Openings 63 and 64 have a similar shape that could be described as approximating a triangle, but with rounded "corners". Opening 65 is a shape that could be described as approximating an orange slice or section. In looking at the shape and direction of the flow corridors from one opening to the other for each pair of openings, it will be seen that in moving from opening 41 to opening 63, the flow corridor is angled inwardly toward the geometric center due to space limitations. Preferably, these flow corridors would be straight. The same is true for the flow corridor connecting opening 42 with opening 64 and for the flow corridor connecting opening 43 with opening 65.

Figure 16:
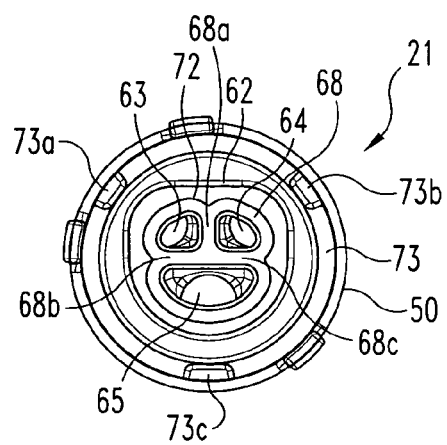
FIG. 16 is a top plan view of the FIG. 10 lower housing.

Surrounding each opening 63, 64, and 65 is a channel 68 that is recessed down into the raised protrusion 62 as illustrated in FIG. 16. While each opening is surrounded by a portion of channel 68, there are sections that are common to two openings such as section 68a between openings 63 and 64, section 68b between openings 63 and 65, and section 68c between openings 64 and 65. Channel 68 is constructed and arranged to receive bottom plate seal 25 (see FIG. 17). Seal 25 is constructed and arranged to fit closely into channel 68 for assisting in the fluid sealing around each opening 63–65 at the interface between protrusion 62 and bottom plate 26. Seal 25 is approximately 0.10 inches in free thickness and includes openings 69, 70, and 71 corresponding to openings 63, 64, and 65, respectively. When seal 25 is properly seated and retained in channel 68, a portion of the thickness of seal 25 extends above the upper surface of the raised protrusion 62. This provides a sufficient amount of material of seal 25 for compression and sealing.

The sidewall 50 of bottom housing 21 includes an interior annular shelf 73 that is coplanar with the upper surface 72 of raised protrusion 62. This shelf 73 includes three positioning tabs 73a, 73b, and 73c for receipt of bottom plate 26. With reference to FIG. 18, it will be seen that the edge periphery defines notches 26a, 26b, and 26c that are constructed and arranged and spaced apart to match tabs 73a, 73b, and 73c. Since the three positioning tabs 73a–73c and the three notches 26a–26c are not equally spaced apart on 120 degree spacing, there is one and only one orientation for bottom plate 26 where it can fit over all three tabs so as to seat horizontally on shelf 73 and compress seal 25. In addition to the seating and alignment of bottom plate 26 via tabs 73a–73c, these three tabs keep the bottom plate 26 from rotating. Bottom plate 26 includes flow openings 74, 75, and 76 that correspond to seal openings 69, 70, and 71, respectively, and to openings 63, 64, and 65, respectively. The bottom plate 26 is made out of stainless steel and its finished thickness is approximately between 0.010 and 0.250 inches, preferably 0.090 inches. This construction results in a degree of flexibility that is advantageous to valve 20. While the same is true for top plate 27, this plate can be more rigid than the bottom plate 26. The cooperating relationship between top plate 27 and bottom plate 26 performs best with the top plate 27 being more rigid and the bottom plate 26 being more flexible. These are very precise component parts in terms of the tolerances on the nominal dimensions, particularly in terms of the flatness and surface finish of the upper surface 80 of bottom plate 26 and the facing lower surface 84 of top plate 27. Focusing first on the upper surface 80, this surface needs to have a flatness, in cooperation with surface 84, to prevent water leakage between bottom plate 26 and top plate 27. This upper surface 80 should be "flat" to within 8 helium light bands, but preferably it will be flat to within 1 helium light band. In terms of the surface finish for upper surface 80, the surface finish should not exceed 8.0 micro inches, preferably a surface finish of Ra<1.0 micro inches. This surface finish can be achieved by lapping net shape. In lieu of using two stainless steel plates, it is contemplated that one of the two plates will be stainless steel and the other plate will be fabricated out of another suitable material such as alumina.

Referring to FIG. 19, top plate 27 is illustrated in greater detail. Top plate 27 defines a flow opening 83 and is constructed and arranged to slide across bottom plate 26 in order to adjust the temperature of the water that is delivered to the user and to adjust the flow rate. The flow openings 74 and 75 in bottom plate 26 provide hot and cold water into the interior mixing chamber of carrier 29. When the solid portion of top plate 27 is positioned to completely cover flow openings 74 and 75, there is no water flow to the remote location. As opening 83 slides into registration over openings 74 and 75, water is permitted to flow. The flow rate depends on the flow areas that are uncovered by the incoming water and the outgoing mixture. The water temperature of the enabled flow depends on the position of opening 83 relative to openings 74 and 75. The amount of hot water that is added to the mix depends on how much of the flow area of opening 74 is "open" or uncovered by the positioning of the top plate 27 and the specific location of opening 83. The same is true for the control of cold water, depending on how much of the flow area of opening 75 is open or uncovered by the positioning of top plate 27 and opening 83. Since the top plate 27 is used to control the water temperature and its flow rate by its positioning on bottom plate 26, relative to openings 74, 75 and 76, the flatness and surface finish of lower surface 84 becomes important in order to prevent water leakage between the two plates.

As described in the context of upper surface 80 of bottom plate 26, surface 84 needs to have a flatness, so as to cooperate with surface 80, in order to prevent water leakage between bottom plate 26 and top plate 27. This bottom surface 84 should be "flat" to within 8 helium light bands, but preferably it will be flat to within 1 helium light band. In terms of the surface finish for bottom surface 84, the surface finish should not exceed 8.0 micro inches, preferably a surface finish of Ra<1.0 micro inches. This surface finish can be achieved by lapping net shape.

With surfaces 80 and 84 designed in this manner, it will be understood that the precise flatness and smoothness allows these two plates in their abutting condition to actually seal the interface between these two plates and around the corresponding openings. The smoothness of these two plates also allows these plates to have very little friction and this in turn takes that frictional variable out of the friction equation of the rest of the fluid control valve 20. Additionally, both lower plate 26 and upper plate 27 are coated with surface protective layers including a strengthening layer and an outer amorphous diamond coating, as disclosed in U.S. patent application Ser. No. 10/322,871, filed Dec. 18, 2002, presently pending. This application is incorporated herein by reference for its disclosure of these surface protective layers. More specifically, the coating includes a thin strengthening layer having higher hardness than the substrate material, and a thin amorphous diamond wear-resistant and friction-reducing layer deposited on the strengthening layer. The amorphous diamond layer provides a low-friction, wear and abrasion resistant sealing surface with particular advantages in water-lubricated or fluid wetted applications. The incorporation of a strengthening layer to support the top amorphous diamond layer provides better scratch and abrasion resistance than an amorphous diamond layer alone. This combination also allows a thinner amorphous diamond layer to be used. The strengthening layer is particularly useful to avoid problems with large particles caught between the mating surfaces which can break through a thin diamond coating because of plastic deformation of the softer substrate beneath.

The outer peripheral edge 85 of upper plate 27 defines three notches 86a, 86b, and 86c. These notches are constructed and arranged to receive matching projections 89a, 89b, and 89c, respectively, that are part of carrier 29. Notches 86a and 86b have more of a rectangular shape compared to notch 86c that is more of a semicircular shape. The cooperating projections 89a–89c are correspondingly shaped for the designed interfit. While the precise shape for the notches and projections is not critical, it is necessary for these cooperating portions to keep the plate 27 from moving and to keep it from being assembled incorrectly.

Referring now to FIGS. 20–25, the details of carrier 29 are illustrated. Carrier 29 is a unitary, molded plastic component. Carrier 29 includes, in addition to raised post 44, an annular body 92 that defines a hollow interior 93 that functions as a mixing chamber. The three projections 89a–89c extend beyond lower edge 94. The hollow interior includes inner cylindrical volume 95 and outer cylindrical volume 96. Shelf 97 of this counterbored configuration receives top plate seal 28 which is configured as an elastomeric O-ring. While the shape of this interior mixing chamber 93 can be similar to opening 83, it has been found that using a cylindrical shape provides an improvement in terms of noise reduction. Since the hot water and cold water are being mixed in this chamber, there is fluid turbulence and this creates noise. This is seen as a negative for faucet products of this type and thus a reduction in noise, as achieved by the present design, is considered to be a design improvement.

The crescent-shaped recess 98 (i.e., core out) is designed to remove plastic material and create an improved design for molding of this part. The selected shape and positioning creates walls 99 and 100 with roughly the same wall thickness and this is beneficial to the molding of this component part.

The three projections 89a–89c fit closely into the three notches 86a–86c defined by top plate 27. With the bottom surface of top plate 27 positioned on the top surface of bottom plate 26, the movement of carrier 29 results in the movement of top plate 27.

The raised post 44 is geometrically centered relative to cylindrical outer surface 106 and has a construction that includes a part-spherical ball portion 107. Ball portion 107 is spherical except for the underside where it integrally connects to circular upper surface 108. Shaft spuds 109 and 110 are coaxially aligned and centered on the geometric center of the spherical part of ball portion 107. Importantly, shaft spud 109 has a size that is different from shaft spud 110 so that the assembly options are limited. The axial centerline through spuds 109 and 110 coincides with the diameter line for upper surface 108 and in effect for outer surface 106. Spuds 109 and 110 also serve to keep the ball stem 34 from rotating. The portion of ball stem 34 that captures raised post 44 includes a slotted, cylindrical sleeve 113 (see FIGS. 35, 37, and 38). When the ball stem 34 and carrier 29 are connected in this manner, each side of sleeve 113 makes line contact (arc) with the part-spherical portion. One arc-shaped line of contact is on one side of spuds 109 and 110 and the other arc-shaped line of contact is on the opposite side of spuds 109 and 110. The spuds 109 and 110 fit within slot 114 that has a generally rectangular shape. However, by making the diameter size of spuds 109 and 110 different, and by sizing and shaping slot 114 in a corresponding manner, only a single assembled orientation between ball stem 34 and carrier 29 is possible. As the ball stem moves side to side in a pivotal or rotational manner for water temperature adjustment, the slot tends to want to slide up on one spud and down on the other and this motion translates into lateral movement of carrier 29 due to the manner in which the various parts are captured and this lateral movement of carrier 29 means lateral movement of top plate 27 relative to bottom plate 26. Top plate 27 can be thought of as a movable plate or disc with bottom plate 26 being thought of as a stationary plate or disc. The specifics of the ball stem motion and the different frictional forces that it senses will be explained in greater detail hereinafter.

Continuing with the sequence of parts as illustrated in FIG. 6, clamp plate 30 is illustrated in greater detail in FIGS. 26–33. Clamp plate 30 is a unitary, molded plastic part that includes an inner, cylindrical sleeve 117 surrounded by an outer, cylindrical wall 118. Four equally-spaced webs 119a–119d connect the outer surface of sleeve 117 with the inner surface of wall 118. An annular radial flange 120 is integrally joined to the upper portion of wall 118. Flange 120 is shaped at five spaced-apart locations with notches 121a–121e. Each notch 121a–121e is of a generally rectangular shape. Three of these notches 121a, 121b, and 121d provide a clearance opening for prongs 53, 52, and 51, respectively. The prongs extend through these clearance notch locations so as to be able to extend up through this component part for a snap-fit receipt by three corresponding openings 122a–122c in top housing 37. Each opening 122a–122c is an enclosed rectangular notch constructed and arranged for the snap-fit receipt so as to clamp together top housing 37 and bottom housing 21. The remaining two notch locations 121c and 121e receive corresponding tabs 123a and 123b, respectively, of top housing 37 for the rotational alignment of top housing 37 onto clamp plate 30.

Prongs 51–53 are each of substantially the same size and shape and correspondingly notches 121a, 121b, and 121d are of substantially the same size and shape. Size and/or shape variations between mating tabs and notches is one way to key one part to another in a precise (single) relationship. With a plurality of mating tabs and notches, this keying into a single relationship can be achieved by using unequal spacings. The spacings between notches 121a and 121b is different from the spacing between notches 121a and 121d. Since the geometric centers of notches 121c and 121e are 180 degrees apart, different notch widths, notch 121c being larger than notch 121e, are used so as to key top housing 37 onto clamp plate 30 in only one possible orientation. Permitting only a single orientation for proper assembly guarantees that the assembly will be correct. This same "only one orientation" scheme is used for the snap-fit connection between the bottom housing 21 and top housing 37.

With continued reference to FIGS. 26–33, cylindrical sleeve 117 defines a notch 126 that is open along edge 127. Notch 126 provides clearance for spring pin 35. As will be described, spring pin 35 seats within spherical ball portion 45 and extends through notch 126 and contacts channel 133 formed on the interior of top housing 37 (see FIGS. 45 and 46). The inner cylindrical surface 128 of sleeve 117 includes a radially inwardly directed portion 129. Annular portion 129 functions as a seat socket for the spherical ball portion 45 of ball stem 34. From the seated position of ball portion 45 against portion 129, cylindrical sleeve 113 extends toward bottom surface 130. Raised post 44 extends upwardly into sleeve 113 to where post 44 snaps into sleeve 113. This snap-fit combination positions upper surface 108 up against bottom surface 130.

With reference now to FIGS. 34–38, the details of ball stem 34 are illustrated. Ball stem 34 includes control lever 38, ball portion 45, sleeve 113, and slot 114, as already described. Ball stem 34 is a unitary, metal component that is finished to precise tolerances and includes a very smooth outer surface for ball portion 45. Alternatively, ball stem 34 can be constructed with a metal, preferably stainless steel stem and a molded plastic ball portion. As described, sleeve 113 is cylindrical and slot 114 is rectangular in shape and cuts through the geometric center of sleeve 113. Bore 136 is machined, or may be molded, into ball portion 45 as a blind hole, at an approximate 74 degree angle relative to the longitudinal, axial centerline 137 of control lever 38. This axial centerline 137 also intersects the geometric center (spherical center) of ball portion 45 and is coincident with the longitudinal centerline 138 of sleeve 113. The axial centerline through bore 136 is coplanar with the center plane dividing slot 114 longitudinally. Bore 136 is constructed and arranged to receive spring 36 and spring pin 35. As described, spring pin 35 extends through notch 126 and into channel 133 on the interior of top housing 37. The tip 140 of spring pin 35 does not contact the base surface of channel 133, but the conical side 143 contacts the channel sides 133a and 133b. It is the angled side 143 that causes the friction. Specifically, spring pin 35 and the contact of side 143 against channel 133 results in an added frictional force being applied against the pivotal movement of ball stem 34 in a direction to change the water temperature. This surface drag causes an increase in the friction otherwise seen by the ball stem 34 as it is directed by the user. The spring-loaded feature for pin 35 allows the pin 35 to push forward to absorb or compensate for wear to the plastic. In effect, there is a "self-wearing" feature created by the spring loading of pin 35 and its receipt in channel 133. Flat 141 on control lever 38 is used for the tightening of a set screw in order to help fix the handle or knob onto the control lever.

The spring pin 35 is illustrated in FIG. 39 and is constructed and arranged as a unitary, molded plastic component. A suitable material for spring pin 35 is PBT (polybutylene terephthalate). The diameter of the cylindrical body 142 is intended to result in a close fit into bore 136 without interference. At one extreme, the fit is line-to-line and at the other extreme the fit has a few thousandth's of an inch clearance on each side. The outer tip 140 is substantially flat and a frustoconical portion 143 extends between top 140 and cylindrical body 142.

With continued reference to spring pin 35 and its assembly within bore 136 at one end and within channel 133 at its opposite end, spring pin 35 has a longitudinal axis that intersects the geometric (spherical) center of ball portion 45. One direction of motion for ball stem 34 is in a plane that is parallel with the longitudinal axis of spring pin 35. This direction of motion controls the water temperature. The other direction of motion for ball stem 34 is in a plane that is perpendicular to the longitudinal axis of spring pin 35. The rotational axes of these two directions of motion intersect at a point location within ball portion 45, preferably at the center of ball portion 45.

With reference now to FIGS. 40–46, the details of top housing 37 are illustrated. Top housing 37 is a unitary, molded plastic component. The preferred material is acetel. As has been described, top housing 37 includes notches 122a–122c, tabs 123a and 123b, and channel 133. Additionally, top housing 37 includes a generally cylindrical body 148 surrounded at its base by cylindrical flange 149.

The body of flange 149 defines rectangular notches 122a–122c. The lower surface 150 of flange 149 includes tabs 123a and 123b.

The body 148 is not completely cylindrical due to the raised arc portion 151. This raised arc portion 151 helps to create and to enclose channel 133. Recessed below top edge 152 of body 148 is an intermediate domed cap 153. The upper surface 154 of cap 153 is integrally connected to the inner surface 155 of body 148 by three webs 156. The webs 156 are ninety degrees apart and the fourth side includes a raised wall 157 that closes the upper end of channel 133. The center of domed cap 153 is open and has a substantially square edge shape for this opening. This square edge shape for the opening cooperates with the ball stem 34 and the remaining structure of fluid control valve 20 to help create what is described as a "square motion". This means that the control or adjustment of temperature is independent of the control or adjustment of the fluid flow rate and vice versa. It also means that the movement or motion in one direction is perpendicular to the other direction of movement or motion. When the top housing 37 and bottom housing 21 are clamped together so as to capture the interior component parts, the ball portion 45 is clamped between clamp plate 30 and top housing 37. The unequal spacing between prongs 51–53 of bottom housing 21 and the corresponding unequal spacing between notches 122a–122c of top housing 37 guarantees that there is only one orientation for the proper assembly of these two parts. This clamped capture of ball portion 45 creates frictional loading on ball portion 45. The level of friction loading due to the clamping force is the same in both directions of movement of ball stem 34.

When tabs 123a and 123b are received by notches 121c and 121e, bottom surface 150 fits up flush against the upper surface 159 of radial flange 120. The interior of flange 149 and body 148 is counterbored to create bore 160 and shelf 161. Sleeve 117 fits into bore 160 and abuts up against shelf 161. This is illustrated in the assembly drawings, see for example FIG. 7.

Figure 47:
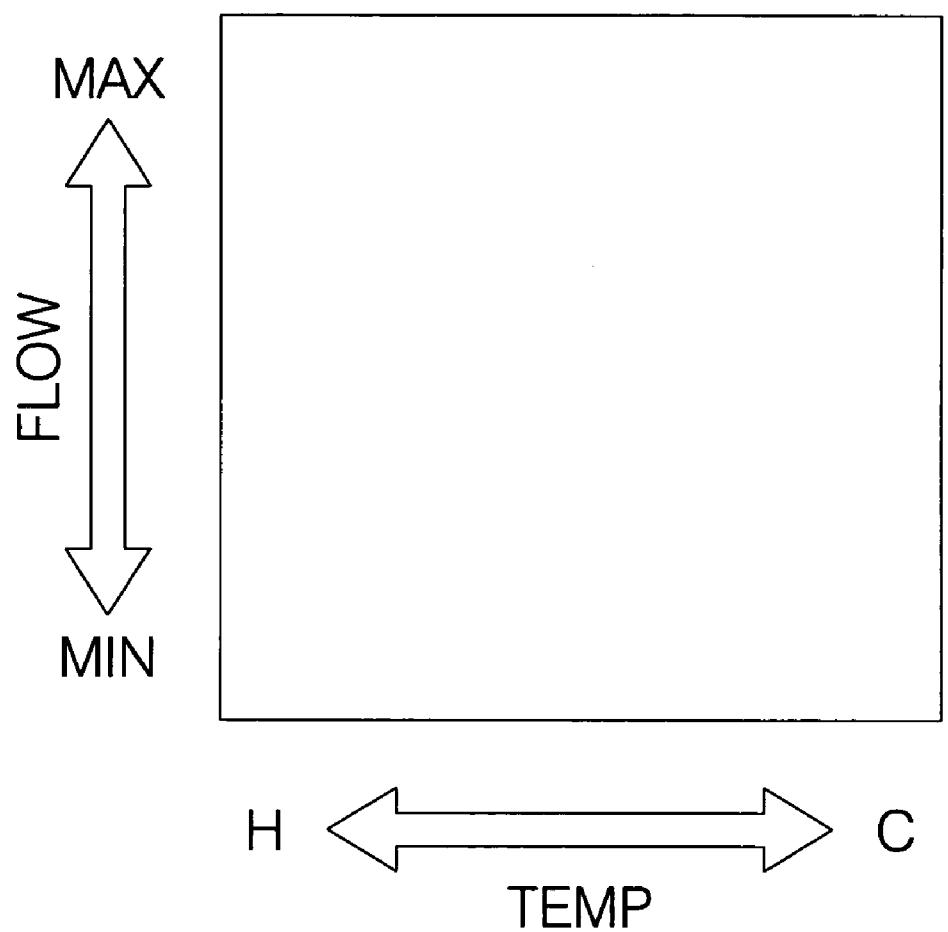
FIG. 47 is a diagrammatic illustration of the square motion concept described as part of the present invention.

While the overall construction of fluid control valve 20 has been described and illustrated, including the detailed description of the component parts, there are important design features incorporated into the present invention that are deserving of special focus. One such design feature is the referenced square motion. As described, it is possible with the present invention to independently adjust the temperature of the water from the flow rate and vice versa. This means that there is temperature memory such that the water flow can be shut off while still retaining the positioning of the movable plate (disc), in this case top plate 27, in its side-to-side orientation so that the mix ratio of hot and cold water is retained. A diagrammatic representation of this square motion is illustrated in FIG. 47 wherein one direction of motion is perpendicular to the other direction of motion. Referring to FIG. 47, it will be seen that left-to-right movement, which is actually pivoting motion of the control lever and ball stem, changes the temperature of the water. However, unless there is forward or backward movement, the flow rate does not change. If movement of the control lever is forward or backward, the flow rate is changed, but as long as there is no side-to-side movement, the temperature does not change. This enables the water temperature to be selected and the water flow shut off without changing or losing that water temperature position. This is why the fluid control valve of the present invention can be described as having a "temperature position memory". All of this is achieved by the design of the ball stem 34, the carrier 29, and their engagement by way of sleeve 113 onto post 44, including ball portion 107, shaft spuds 109 and 110, and the socket created in part by annular portion 129.

One design feature of the present invention is a structure that makes the frictional force or frictional loading in one direction of motion different from the frictional force or frictional loading in the other (independent) direction of motion. While the clamping of the ball portion 45 between clamp plate 30 and upper housing 37 creates a first frictional load component, this frictional load component is the same in both directions. What causes the frictional load in one direction to be different from the frictional load in the other direction is influenced in part by the length of the two respective moment arms. In effect, the total frictional loading on the ball stem in the first direction, such as fluid flow, is controlled primarily by the frictional loading on the ball portion 45 due to its clamped condition between the clamp plate and upper housing. However, in the second direction of motion, in this case for controlling the temperature of the water, the total frictional loading is the combination of the frictional loading due to capture of the ball portion and the frictional loading due to the spring pin, i.e., a force acting at a distance.

One moment arm is measured from the spherical center point of ball portion 45 to the area of contact between pin 35 and channel 133. The other moment arm is measured from the axial centerline of pin 35 to the outside diameter of pin 35 as it rubs against the inside diameter surface of bore 136. With the selected configuration and intended operation for the present invention, it is desirable to have the "one" moment arm greater in length than the "other" moment arm. Another important design feature associated with the ball stem 34, pin 35, and channel 133 includes the use of "TEFLON" washer 39 on the back side of pin 35 to create lower friction at that location. A still further important design feature of the present invention is the use of different materials for the pin 35 and the channel 133 to create higher friction at their contact location.

Considering spring pin 35 and its positioning or assembly within bore 136, it will be understood that rotation of the captured ball portion 45 in a direction that adjusts or controls the temperature of the water causes the conical side 143 of spring pin 35 to slide in channel 133 and the contact between spring pin 35 and channel 133 creates a frictional force. This force is applied at the end of a moment arm. The length of this moment arm is measured from the point of contact between the spring pin 35 and channel 133 to the geometric (spherical) center of ball portion 45. The spring pin 35 has a longitudinal axis that intersects the geometric center of ball portion 45.

When the ball portion 45 is rotated in a direction that adjusts the water flow rate, this causes the ball portion to turn relative to spring pin 35, actually rotating about the longitudinal axis of spring pin 35. This direction of motion has a shorter moment arm compared to the moment arm associated with the temperature adjustment. From this description, it should be understood that each direction of motion is independent of the other and the axis of rotation corresponding to each direction of motion intersects the other and intersects at a point within the center of ball portion 45, actually intersecting at the geometric (spherical) center of ball portion 45. Considering spring pin 35 and its longitudinal axis, one direction of motion is in a geometric plane that is actually coplanar with or parallel to the longitudinal axis of spring pin 35. The other direction of motion is in a plane that is generally perpendicular to the longitudinal axis of spring pin 35.

While the ease of rotation of ball portion 45 is a function of the applied force acting at the moment arm length, the present invention is constructed and arranged to create a lighter frictional load and thus an easier or lighter feel for rotation of ball portion 45 in the flow-control direction as compared to the temperature-control direction. What is important is to create a different "feel" to the user between the force necessary to adjust the water temperature and the force necessary to adjust the water flow rate. A brief review of the drawings provided herein will make it clear that the two described moment arms are of different lengths. When the frictional forces and loading on the captured ball portion are factored into the overall loading calculations, the desire is to have a force loading ratio between the force required to rotate the ball portion 45 to adjust the temperature and the force required to rotate the ball portion 45 to adjust the water flow rate set at something higher than 1:1. For example, one design for this force loading ratio contemplates a 2:1 ratio. With this approximate 2:1 force loading ratio, there will be a "tendency" by the user to more readily or more easily change or adjust the flow as compared to changing the temperature. A ratio significantly less than 2:1 would result in a fluid control valve design where the sense of touch and feel provided to the user is harder to distinguish between the two directions. Obviously, the closer this force loading ratio comes to a 1:1 ratio, the less noticeable any frictional differences will be, down to a 1:1 ratio where there are none. Preferably the ratio does not exceed 4:1. This is considered to be the upper limit ergonomically in the sense of what this ratio represents as extremes. In order to have a 4:1 ratio relative to the two frictional forces sensed by the user, one of two things have to occur. Either a requirement for the user to exert substantial force in order to rotate the ball portion for a change in temperature or a force level for flow control that is too light or too loose. Whenever the required force from the user is too low, the fluid control valve generates a feel (feedback) that seems too loose or light and it is too hard to obtain the desired setting.

The spring pin 35 is spring biased and while a high spring force, a function of the spring constant and compression, does have an effect on the frictional loading, this spring pin performs other functions. First, the spring pin 35 serves as a guide pin for helping to control the movement of ball stem 34. As such, the spring pin 35 can be constructed and arranged as an integral part of the ball portion. This can be accomplished by machining the ball portion and pin as a unitary component or by brazing a separately manufactured pin into the bore of the ball portion so as to create an integral combination.

Another function performed by spring pin 35 and spring 36 is to maintain a biasing force on the captured ball portion in order to stabilize its movement and take out any looseness or play in the ball stem 34. The spring 36 causes the spring pin 35 to continue to make contact with channel 133 even after wear (i.e., wear-compensated) and even after any tolerance extremes that might contribute to the fluid control valve 20 having an undesirable play in the control function motions. The use of spring 36 results in the continued application of a spring biasing force against ball portion 45.

Yet another function performed by spring pin 35 is to prevent rotation of ball portion 45 about the longitudinal axis 137 as this would change the circumferential positioning of top plate 27. If top plate 27 is allowed to rotate, this destroys the critically designed alignment and overlap between top plate 27 and bottom plate 26.

Indirectly related to the two degrees of freedom of fluid control valve 20, one for temperature and the other for flow, is the use of a universal union or connector for ball stem 34 provided by the design of raised post 44 of carrier 29. The sleeve 113 tightly fits onto the ball portion 107 and the shaft spuds 109 and 110 are received within slot 114. In effect what is created is a ball and socket connection with a pin through it. While enabling movement of ball stem 34 in two independent directions, this design also translates the pivoting or rotational motion of ball portion 45 into lateral movement of carrier 29 and in turn sliding movement of top plate 27 across the upper surface 80 of bottom plate 26.

Another design feature of the present invention relates to the design and construction of the top plate 27 and bottom plate 26. Earlier designs for plate or disc combinations of this general type, typically one stationary and one movable, have used a ceramic material that is extremely rigid without any noticeable or appreciable flexibility. Without any flexibility, these component parts must be extremely flat in order to prevent leakage at the interface between the two plates (or discs). The degree of overlap between the two plates can also contribute to leakage, due to the surface area, but in order to achieve all of the desired control functions with an adequate range of motion for control lever 38, a maximum degree of overlap is advantageous.

The present invention improves upon the design of ceramic plates or discs by using stainless steel. However, these stainless steel upper and lower plates include an extremely hard surface coating that is used in order to address any wear issues. Generally speaking, the design requirements for the top and bottom plates would preclude the use of stainless steel due to wear and galling. Fluid control valves of the general type described herein are intended to operate, reliably and in effect worry-free, without any leakage for hundreds of thousands of cycles. For these requirements, manufacturers cannot accept a material that will wear or gall during use such that there is too short of a useful life. For this reason, a person of ordinary skill would not select stainless steel for these upper and lower discs. However, with the very hard surface coating ("diamond" coating) applied to top plate 27 and to bottom plate 26, stainless steel becomes an acceptable material and is able to be used successfully for this application. An important property of this coated stainless steel, as compared to ceramic materials, is its ability to flex. Since the top plate 27 and bottom plate 26 both possess this property of flexibility, one plate can actually "mold" or conform itself to the other in order to get a better seal under fluid pressure. This in turn permits slightly looser tolerances on flatness for the top plate and bottom plate. Stainless steel discs are known to have been used for seals in devices such as pump seals that distribute oil, for example, where small volume leakage is acceptable. Due to the viscosity of oil, these devices permit a more relaxed design in terms of flatness. However, with fluid control valves for water faucets, no leakage is acceptable and the discs must be extremely flat.

Since the degree of flatness is a cost issue, the selection of a flexible material enables the flatness requirement to be relaxed and thus there are certain cost savings. Normally, the harder materials are not flexible and one important aspect of the disclosed design for top plate 27 and bottom plate 26 is the use of the referenced diamond coating. This unique coating adds the requisite hardness without sacrificing the desirable flexibility. The condition surfaces of the top and bottom plates 26 and 27, respectively, retain the base metal flexibility while providing adequate hardness for an acceptable useful life.

While the facing surfaces 80 and 84 of plates 26 and 27, respectively, are designed to be flat, if there is any surface curvature, it is preferable for the facing surfaces to be convex as opposed to concave. As has been described, the flow openings are located more to the center of the plates away from the outer edges. Accordingly, convex curvatures have contact closer to the flow openings that need to be sealed around. If concave curvatures would be present, their contact would be closer to the outer edge and not around the flow openings. It has also been learned that as the referenced "diamond" coating is applied, there is a tendency for the stainless steel plate to take on a slight curvature. The result is the creation of a convex shape to the facing plate surfaces that receive the coating. Beginning with extremely flat stainless steel plates, prior to the coating, ensures that whatever slight curvature is created as a result of the coating will be extremely slight, but fortunately is convex which, as described, is preferably to concave.

Another design feature of the present invention pertains to the construction and arrangement of the top housing 37 and bottom housing 21 and the interfit of prongs 51–53 into notches 122b, 122a, and 122c, respectively. As a result of this construction, there are only three points of clamping that hold together the entire fluid control valve 20. This in turn means that there are only three parts to be controlled as far as the overall assembly tolerances, and these include the top housing 37, the bottom housing 21, and clamp plate 30, due to the radial flange 120 that is clamped between the top housing 37 and the bottom housing 21. This particular construction can be described as an anti-seizing design and this particular design contributes to a lower cost for fluid control valve 20, including ease of assembly into a convenient, self-contained cartridge for assembly into the faucet bottom housing and threaded closing by the bonnet (not illustrated).

The referenced interfit of prongs 51–53 into notches 122a–122c can be described as a snap-fit assembly of the top or upper housing 37 and the bottom or lower housing 21. Dimensionally, once the prongs 51–53 of bottom housing 21 snap into the corresponding notches 122a–122c, there is a modest amount of clearance, enabling relative axial movement between the top housing 37 and the bottom housing 21.

The snap-fit assembly of the top housing 37 and bottom housing 21 defines an interior pocket that receives all of the remaining component parts of fluid control valve 20, except for seats 22, seat springs 23, and snout seal 24 that are exterior to the defined interior pocket. The component parts that are assembled into the defined interior pocket are illustrated in FIG. 6. Importantly, the designed amount of dimensional clearance resulting in the relative axial movement is sufficient to permit each received component part to go to its high side tolerance without this maximum tolerance stack up interfering with the snap-fit assembly of the top housing 37 and bottom housing 21.

The dimensional clearance is also sufficient to allow the bottom housing 21 and the bottom plate 26 to "float" in an axial direction in response to varying fluid pressure. This is part of the design philosophy for the spring-biased seats 22. As the bottom housing floats, it is important that there is no break in the sealed interface and connection between the fluid control valve and the faucet base (not illustrated).

Another feature of the present invention relates in part to the use of the two seats 22 and the two seat springs 23 in an overall hydraulic balance for fluid control valve 20. This design and construction technique is used to make the overall sealing dependent on the supply pressure. When the sealing is dependent on the supply pressure, it results in reduced wear within the fluid control valve and minimizes any tolerance issues or concerns regarding the design of the components on the interior of the fluid control valve in order to obtain an effective and reliable seal. The construction and arrangement of fluid control valve, using this hydrobalance construction technique, affects the "feel" of the faucet handle as connected to ball stem 34. This actually makes the feel more uniform over the low to high pressure range. If the sealing is not dependent on the supply pressure, as is considered typical of prior art designs, the feel of the handle ranges from loose to stiff depending on the supply pressure. Ergonomically, this range of feel to the manipulation of the faucet handle is seen as a disadvantage. Another design consideration when the sealing is not dependent on the supply pressure requires that the fluid control valve be clamped together to withstand the maximum inlet pressure. Otherwise, at a lower clamping force, the fluid control valve sealing components could separate when the higher pressure is experienced.

The hydraulically balanced concept involves an analysis of the forces that are present that try to separate the fluid control valve components. The forces are calculated by considering the projected areas exposed to fluid pressure and the level of that fluid pressure over that projected area. The key is to configure the fluid control valve 20 and the component parts that comprise the fluid control valve 20 such that the projected area across the seats is the greatest relative to other projected areas. While the seal wants to separate, its contact with the bottom housing causes the fluid control valve to move up. The spring biasing of the two seats maintains a fluid-tight connection interface at low pressure with the faucet housing base. The flow inlet has a "hydraulically wetted" area that is exposed to the incoming fluid supply pressure.

What results from the hydrobalance design for fluid control valve 20 is that the fluid control valve 20 actually "floats" relative to the faucet housing base. The spring biasing of seats 22 by way of seat springs 23 is helpful to address very low pressure conditions in that the springs maintain a sealed interface between seats 22 and the faucet housing base (not illustrated).

There are various structures disclosed in prior art patents where hydraulically balanced principals are involved. Some of these prior art patents include U.S. Pat. No. 4,610,268, issued Sep. 9, 1986 to Knapp; U.S. Pat. No. 4,733,694, issued Mar. 29, 1988 to Knapp; U.S. Pat. No. 4,754,783, issued Jul. 5, 1988 to Knapp; U.S. Pat. No. 4,942,902, issued Jul. 24, 1990 to Knapp; and U.S. Pat. No. 4,957,135, issued Sep. 18, 1990 to Knapp. Each of these five patents is expressly incorporated by reference herein for their disclosure of the hydrobalance concept and the corresponding valve structures.

While the preferred embodiment of the present invention has been illustrated and described in the context of fluid control valve 20, there are a few design alternatives and other constructions that are considered to be part of the present invention.

In the FIG. 9 illustration, curved broken line 165 that is drawn into clamp plate 30 denotes a continuation of the channel (item 133 in FIGS. 45 and 46) that is defined by top housing 37. As described, the spring-biased guide pin 35 rides in channel 133. The extension of the arc of channel 133 into clamp plate 30, as denoted by the broken line, is intended to describe that a portion of the clamp plate can be used for a portion of the guide pin channel. In addition, by repositioning of the receiving bore in ball portion 45, it is possible to use only the clamp plate for the receiving channel for the guide pin.

While FIG. 9 illustrates the preferred embodiment of the present invention, FIG. 48 illustrates an alternative construction that is envisioned for the present invention. In FIG. 48, the spring-biased guide pin 35a is received by the top housing 37a and travels in a channel 133a that is defined by ball portion 45a. The letter "a" has been used to denote these alternative design components. FIG. 48 has also been used to illustrate another design alternative regarding the connection between the ball stem and the carrier. This alternative construction will be described hereinafter. The remainder of the construction and functioning of the fluid control valve corresponding to FIG. 48 is generally the same as that described with respect to fluid control valve 20.

Since either the FIG. 9 construction or the FIG. 48 construction can be used, some of the important points to note are that the guide pin 35, 35a is spring-biased and that it extends between the ball portion 45, 45a and the channel 133, 133a. Whether the guide pin rides in and moves relative to the channel 133 in the top housing or the channel 133a in the ball portion, the guide pin functioning relative to the remainder of the fluid control valve is basically the same with either configuration.

With reference to FIGS. 7–9, 20–22, and 34–37, it will be clear that the ball portion 45 (specifically sleeve 113) provides the receiving slot 114 and the carrier 29 provides the universal connector in the form of raised post 44. The manner in which the raised post 44 is received within slot 114 can be reversed, as is illustrated in FIGS. 48 and 49. As described, in FIGS. 48 and 49, the ball portion 45a includes a raised post 44a that connects with receiving slot 114a that is defined by carrier 29a. It will be understood that this is the reverse of the raised post 44 and receiving slot 114 construction as illustrated and described above.

It will also be seen that relative to the remainder of the fluid control valve, the orientation of raised post 44a and receiving slot 114a have been turned or rotated ninety degrees (90°). With regard to this alternative construction, it is to be understood that the ninety degree rotational change can be used independently of the reverse configuration for raised post 44, 44a and receiving slot 114, 114a and independently of the reverse configuration for the guide pin 35, 35a and channel 133, 133a. Similarly, the reverse configuration for the raised post 44, 44a and receiving slot 114, 114a can be used independently of the reverse configuration for the guide pin 35, 35a and channel 113, 113a.

FIGS. 48 and 49 are intended to be generally the same as FIGS. 8 and 9, respectively, except for the guide pin change and the connector change in reversing the slot and raised post locations with regard to their corresponding or supporting component part. A purpose of this connection is to translate pivoting motion of the ball stem 34 into lateral movement of the top plate (or disc) 27 relative to the stationary bottom plate (or disc) 26. This particular translation of motion can be achieved with the receiving slot 114 and raised post 44 relationship as illustrated in FIGS. 7–9, for example, or this can be achieved as illustrated in FIGS. 48 and 49.

Another design alternative for fluid control valve 20 is illustrated in FIG. 50. It should be understood than when adjusting the water flow rate and when adjusting the water temperature, the guide pin 35 moves in or relative to a channel, whether channel 133 or 133a. Since there is surface-to-surface contact between the guide pin and the corresponding channel, it is contemplated to provide one or more raised bumps or ribs and/or recessed detents in order to provide a tactile sense of a particular ball stem position and a corresponding flow or temperature setting. A recessed detent 166 is positioned in channel 133b of top housing 37b in FIG. 50 as one example of this alternative construction. The use of recessed detent 166 enables the user to have a "feel" for when the ball stem 34 of fluid control valve 20 is positioned for a midpoint (neutral) water temperature. Similar recessed detents can be used for a tactile feel of other water temperature positions, such as detents 166a and 166b.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A fluid control valve for the mixing of hot and cold water and delivery at a selected flow rate, said fluid control valve comprising:
   a lower housing having an open interior and defining a plurality of flow inlets and a flow outlet;
   a first flow disc positioned within said open interior;
   a second flow disc positioned on said first flow disc and being movable relative to said first flow disc to control the mixing proportions of hot and cold water and to control the flow rate of water to be delivered via said flow outlet;
   a carrier constructed and arranged to control the movement of said second flow disc;
   a ball stem having a ball portion and a control lever, said ball portion being connected to said carrier whereby movement of said control lever pivots said ball portion and the pivoting of said ball portion translates into lateral movement of said carrier;
   a spring-biased guide pin extending between said ball portion and a cooperating structure of said fluid control valve;
   a clamp plate receiving said ball portion; and
   an upper housing constructed and arranged to enclose said ball portion in cooperation with said clamp plate, said upper housing being connected with said lower housing.

2. The fluid control valve of claim 1 wherein said lower housing includes a plurality of first snap-fit structures and said upper housing includes a plurality of second snap-fit structures that are constructed and arranged to cooperate with said first snap-fit structures so as to clamp said first flow disc, said second flow disc, said carrier, said ball portion, and said clamp plate between said lower housing and said upper housing.

3. The fluid control valve of claim 2 wherein said lower housing is a unitary, molded plastic component and each first snap-fit structure of said plurality is constructed and arranged as a prong extending toward said upper housing.

4. The fluid control valve of claim 3 wherein said upper housing is a unitary, molded plastic component and each second snap-fit structure of said plurality is constructed and arranged as a notch.

5. The fluid control valve of claim 4 wherein each prong of said plurality of prongs includes a snap-fit tip and wherein each notch of said plurality of notches is enclosed.

6. The fluid control valve of claim 5 wherein said cooperating structure includes said upper housing and wherein said guide pin is constructed and arranged for engaging a portion of said upper housing.

7. The fluid control valve of claim 6 wherein said guide pin includes a conical portion that is constructed and arranged for maintaining contact with said upper housing.

8. The fluid control valve of claim 7 wherein said first flow disc and said second flow disc are each constructed out of stainless steel.

9. The fluid control valve of claim 8 wherein said carrier includes an upright post for receipt of said ball portion, the connection between said ball portion and said upright post enabling two separate and independent directions of motion for said ball stem, one direction of motion constructed and arranged to control the temperature of the water and the other direction of motion being constructed and arranged to control the flow rate of the water.

10. The fluid control valve of claim 9 wherein said two separate and independent directions of motion are perpendicular to each other.

11. The fluid control valve of claim 1 wherein said cooperating structure includes said clamp plate and wherein said guide pin is constructed and arranged for engaging a portion of said clamp plate.

12. The fluid control valve of claim 1 wherein said cooperating structure includes said upper housing and wherein said guide pin is constructed and arranged for engaging a portion of said upper housing.

13. The fluid control valve of claim 12 wherein said guide pin includes a conical portion that is constructed and arranged for maintaining contact with said upper housing.

14. The fluid control valve of claim 1 wherein said first flow disc and said second flow disc are each constructed out of stainless steel.

15. The fluid control valve of claim 1 wherein one of said carrier and said ball portion includes an upright post for receipt by the other one of said carrier and said ball portion, the connection between said ball portion and said carder enabling two separate and independent directions of motion for said ball stem, one direction of motion constructed and arranged to control the temperature of the water and the other direction of motion being constructed and arranged to control the flow rate of the water.

16. The fluid control valve of claim 15 wherein said two separate and independent directions of motion are perpendicular to each other.

* * * * *

UNITED STATES PATENT AND TRADEMARK OFFICE
CERTIFICATE OF CORRECTION

| | | |
|---|---|---|
| PATENT NO. | : 7,108,012 B2 | Page 1 of 1 |
| APPLICATION NO. | : 10/897282 | |
| DATED | : September 19, 2006 | |
| INVENTOR(S) | : Michael Scot Rosko et al. | |

It is certified that error appears in the above-identified patent and that said Letters Patent is hereby corrected as shown below:

<u>TITLE PAGE, ITEM (73) ASSIGNEE:</u>
    Replace "ID" with -- IN --.

<u>Column 20,</u>
    Line 10, replace "carder" with -- carrier--.

Signed and Sealed this

Ninth Day of January, 2007

JON W. DUDAS
*Director of the United States Patent and Trademark Office*